United States Patent
Wen et al.

(10) Patent No.: US 9,775,043 B2
(45) Date of Patent: Sep. 26, 2017

(54) NETWORK LOCKING METHOD AND SYSTEM FOR WIRELESS TERMINAL

(71) Applicant: ZTE Corporation, Shenzhen (CN)

(72) Inventors: Hailong Wen, Shenzhen (CN); Wei Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/104,814

(22) PCT Filed: May 23, 2014

(86) PCT No.: PCT/CN2014/078319
§ 371 (c)(1),
(2) Date: Jun. 15, 2016

(87) PCT Pub. No.: WO2014/187363
PCT Pub. Date: Nov. 27, 2014

(65) Prior Publication Data
US 2016/0345175 A1    Nov. 24, 2016

(30) Foreign Application Priority Data
Dec. 20, 2013 (CN) .......................... 2013 1 0717670

(51) Int. Cl.
*H04B 1/06* (2006.01)
*H04M 1/66* (2006.01)
(Continued)

(52) U.S. Cl.
CPC .......... *H04W 12/08* (2013.01); *H04L 9/3268* (2013.01); *H04L 63/0823* (2013.01);
(Continued)

(58) Field of Classification Search
CPC ... H04L 9/3263; H04L 3/0823; H04L 9/3268; H04L 63/10
(Continued)

(56) References Cited

U.S. PATENT DOCUMENTS 5,185,705 A * 2/1993 Farrington ............... H02H 3/04
361/115
7,587,600 B2 9/2009 Bodensjoe
(Continued)

FOREIGN PATENT DOCUMENTS

CN    1682488 A    10/2005
CN    101018125 A   8/2007
(Continued)

OTHER PUBLICATIONS

International Search Report in international application No. PCT/CN2014/078319, mailed on Sep. 26, 2014.
(Continued)

*Primary Examiner* — William D Cumming
(74) *Attorney, Agent, or Firm* — Oppedahl Patent Law Firm LLC

(57) ABSTRACT

The present disclosure provides a network locking method for a wireless terminal, comprising: a front-end network-locking module sends a locking certificate generation request to a wireless terminal, and the wireless terminal generates a locking certificate according to the locking certificate generation request; a back-end network-locking module signs the locking certificate to generate a signed locking certificate; the front-end network-locking module performs communication interaction with the wireless terminal to send the signed locking certificate to the wireless terminal, for the wireless terminal to perform locking operations.

10 Claims, 5 Drawing Sheets

(51) Int. Cl.
*H04M 1/68* (2006.01)
*H04M 3/16* (2006.01)
*H04M 3/00* (2006.01)
*H04W 12/08* (2009.01)
*H04L 29/06* (2006.01)
*H04W 12/06* (2009.01)
*H04W 12/10* (2009.01)
*H04L 9/32* (2006.01)
*H04W 88/02* (2009.01)

(52) U.S. Cl.
CPC ............ *H04W 12/06* (2013.01); *H04W 12/10* (2013.01); *H04W 88/02* (2013.01)

(58) Field of Classification Search
USPC ..................... 455/411, 26.1, 420; 380/247
See application file for complete search history.

(56) References Cited

U.S. PATENT DOCUMENTS

| | | | | |
|---|---|---|---|---|
| 8,064,598 B2* | 11/2011 | Vaha-Sipila | ........ | H04L 63/0823 380/247 |
| 8,600,056 B2* | 12/2013 | Heurtaux | .............. | H04L 9/3263 380/247 |
| 8,732,458 B2* | 5/2014 | Liu | .......................... | H04L 63/10 455/26.1 |
| 8,751,824 B2* | 6/2014 | Lin | .......................... | G06F 21/44 713/192 |
| 8,812,837 B2* | 8/2014 | McCanna | ............. | H04L 9/3268 455/411 |
| 2004/0205148 A1* | 10/2004 | Bae | ..................... | G06F 11/1425 709/213 |
| 2006/0236111 A1 | 10/2006 | Bodensjoe | | |
| 2008/0125094 A1* | 5/2008 | Heurtaux | .............. | H04L 9/3263 455/411 |
| 2008/0209206 A1 | 8/2008 | Vaha-Sipila | | |
| 2010/0217710 A1* | 8/2010 | Fujita | ..................... | G06Q 20/06 705/71 |
| 2010/0299748 A1 | 11/2010 | Johansson | | |
| 2011/0119739 A1 | 5/2011 | Medvinsky | | |
| 2013/0031375 A1* | 1/2013 | Lin | ......................... | G06F 21/44 713/192 |
| 2013/0157517 A1* | 6/2013 | Liang | ..................... | H01R 24/64 439/676 |
| 2015/0119019 A1* | 4/2015 | Minichmayr | ....... | G07C 9/00571 455/420 |
| 2016/0345175 A1* | 11/2016 | Wen | .................... | H04L 63/0823 |

FOREIGN PATENT DOCUMENTS

| | | |
|---|---|---|
| CN | 101534482 A | 9/2009 |
| EP | 2071898 A1 | 6/2009 |
| JP | 2005539304 A | 12/2005 |
| JP | 2008538874 A | 11/2008 |
| JP | 2012235182 A | 11/2012 |

OTHER PUBLICATIONS

English Translation of the Written Opinion of the International Search Authority in international application No. PCT/CN2014/078319, mailed on Sep. 26, 2014.

Supplementary European Search Report in European application No. 14800946.7, mailed on Nov. 25, 2016.

* cited by examiner

NETWORK LOCKING METHOD AND SYSTEM FOR WIRELESS TERMINAL

TECHNICAL FIELD

The present disclosure relates to the network-locking technical field of wireless terminals, and more particularly, to a network locking method and a network locking system for a wireless terminal.

BACKGROUND

With the development of mobile communication technologies, the competition among operators becomes increasingly fierce. To attract clients, most operators often provide a wireless terminal to a user at a low price or free and meanwhile restrain this wireless terminal to use the network service provided by themselves only through a network-locking technology, thereby making profits.

Generally, the locking process of a wireless terminal needs to use a softdog, which stores a private key to encrypt the locking data, while the public key is stored in the wireless terminal. The network-locking operations of wireless terminals basically are finished on a production line; however, outfield test often needs to perform network-locking function testing too. Since the network-locking function testing cannot be performed without a softdog, outfield testers need to carry a softdog or email the softdog to the front end, this not only increases the network-locking cost, but probably could bring a great risk to the network-locking security of wireless terminals due to the loss of softdog caused by the improper storage at the front end.

SUMMARY

Embodiments of the present disclosure mainly aim at providing a network locking method and a network locking system for a wireless terminal, so as to reduce the security risk caused by outfield test and locking operations from operators and post-sale service agents while reducing cost.

In view of the above, an embodiment of the present disclosure provides a network locking method for a wireless terminal, including:

a front-end network-locking module sends a locking certificate generation request to a wireless terminal, and the wireless terminal generates a locking certificate according to the locking certificate generation request;

a back-end network-locking module signs the locking certificate to generate a signed locking certificate;

the front-end network-locking module performs communication interaction with the wireless terminal to send the signed locking certificate to the wireless terminal, for the wireless terminal to perform locking operations.

Preferably, the step that the wireless terminal generates a locking certificate according to the locking certificate generation request may include:

the wireless terminal reads locally hardware feature information which can identify the wireless terminal uniquely, encrypts the hardware feature information using a locking public key locally saved to generate a locking certificate and returns the locking certificate to the front-end network-locking module.

Preferably, the step that a back-end network-locking module signs the locking certificate to generate a signed locking certificate may include:

decrypting the locking certificate using a softdog private key to get the hardware feature information of the wireless terminal;

encrypting a plaintext of the hardware feature information of the wireless terminal using a softdog private key to generate a signed locking certificate.

Preferably, the step that a back-end network-locking module signs the locking certificate to generate a signed locking certificate may further include:

encrypting locking data using a softdog private key and inserting a ciphertext into the signed locking certificate.

Preferably, the step that the front-end network-locking module performs communication interaction with the wireless terminal to send the signed locking certificate to the wireless terminal for the wireless terminal to perform locking operations may include:

the wireless terminal requests the front-end network-locking module to transmit the signed locking certificate, according to the request received from the front-end network-locking module to lock using a locking certificate;

after receiving the signed locking certificate, the wireless terminal checks whether the signed locking certificate contains locking data; if so, the wireless terminal verifies the locking data and performs locking operations after the verifying is passed;

otherwise, the wireless terminal returns a response message about allowing locking operations to the front-end network-locking module;

the front-end network-locking module sends the locking data to the wireless terminal according to the response message about allowing locking operations fed back from a network-locking unit, for the wireless terminal to perform locking operations.

Preferably, before the wireless terminal checks whether the signed locking certificate contains locking data, the method may further include:

the wireless terminal decrypts the signed locking certificate using a locking public key locally saved to get a plaintext of hardware feature information;

the wireless terminal judges whether the hardware feature information in the signed locking certificate is consistent with local hardware feature information; if so, the wireless terminal checks whether the signed locking certificate contains locking data; otherwise, the wireless terminal returns a response about denying locking operations and ends the locking process.

An embodiment of the present disclosure also provides a network locking system for a wireless terminal, including: a front-end network-locking module, a back-end network-locking module and a terminal execution unit, wherein the terminal execution unit can be viewed as a wireless terminal during the specific implementation of hardware;

the front-end network-locking module is configured to send a locking certificate generation request to the terminal execution unit;

the back-end network-locking module is configured to sign the locking certificate to generate a signed locking certificate;

the front-end network-locking module is further configured to perform communication interaction with the terminal execution unit, to send the signed locking certificate to the terminal execution unit for the terminal execution unit to perform locking operations;

the terminal execution unit includes:

a locking certificate processing unit, which is configured to generate a locking certificate according to the locking certificate generation request;

a network-locking unit, which is configured to perform communication interaction with the front-end network-locking module and to perform locking operations according to the signed locking certificate.

Preferably, the locking certificate processing unit may be configured to read locally hardware feature information which can identify the terminal execution unit uniquely, to encrypt the hardware feature information using a locking public key locally saved to generate a locking certificate, and to return the locking certificate to the front-end network-locking module.

Preferably, the back-end network-locking module may be configured to decrypt the locking certificate using a softdog private key to get the hardware feature information of the terminal execution unit, and to encrypt a plaintext of the hardware feature information of the terminal execution unit using a softdog private key to generate a signed locking certificate.

Preferably, the back-end network-locking module may be configured to encrypt the locking data using a softdog private key and to insert a ciphertext into the signed locking certificate.

Preferably, the network-locking unit may be configured to: receive a request from the front-end network-locking module to lock using a locking certificate and request the front-end network-locking module to transmit the signed locking certificate; after receiving the signed locking certificate, check whether the signed locking certificate contains the locking data; if so, verify the locking data and perform locking operations after the verifying is passed; otherwise, return a response message about allowing locking operations to the front-end network-locking module;

the front-end network-locking module may further be configured to send the locking data to the terminal execution unit according to the response message about allowing locking operations fed back from the network-locking unit, for the terminal execution unit to perform locking operations.

Preferably, the network-locking unit may further be configured to: decrypt the signed locking certificate using a locking public key locally saved to get a plaintext of hardware feature information, and judge whether the hardware feature information in the signed locking certificate is consistent with local hardware feature information; if so, check whether the signed locking certificate contains locking data; otherwise, return a response about denying locking operations and end the locking process.

While performing processing, the front-end network-locking module, the back-end network-locking module, the locking certificate processing unit and the network-locking unit may be realized adopting a Central Processing Unit (CPU), a Digital Signal Processor (DSP) or a Field-Programmable Gate Array (FPGA).

Compared with the conventional art, the embodiment of the present disclosure divides the network-locking operation into a front end part and a back end part; the front-end network-locking module is configured to generate a locking certificate and to perform locking operations, while the back-end network-locking module is configured to digitally sign the locking certificate. During outfield testing, a front-end tester first uses the front-end network-locking module and the wireless terminal to be locked with a network to generate a locking certificate, and then sends the generated locking certificate to the back end (company or home), then the back-end personnel uses the back-end network-locking module and the softdog to sign the locking certificate, and then sends the signed locking certificate to the front-end tester; next, the front-end tester uses the front-end network-locking module to send the signed locking certificate to the wireless terminal to perform locking operations. With this scheme, there is no need to send a softdog to the front end. This scheme not only can reduce cost, but also can greatly reduce the security risk brought to network locking by outfield testing.

DETAILED DESCRIPTION

The technical scheme of the present disclosure is described below in further detail in conjunction with the accompanying drawings and specific embodiments. It should be understood that specific embodiments described below are only to illustrate the present disclosure, but to limit the present disclosure.

Figure 1:
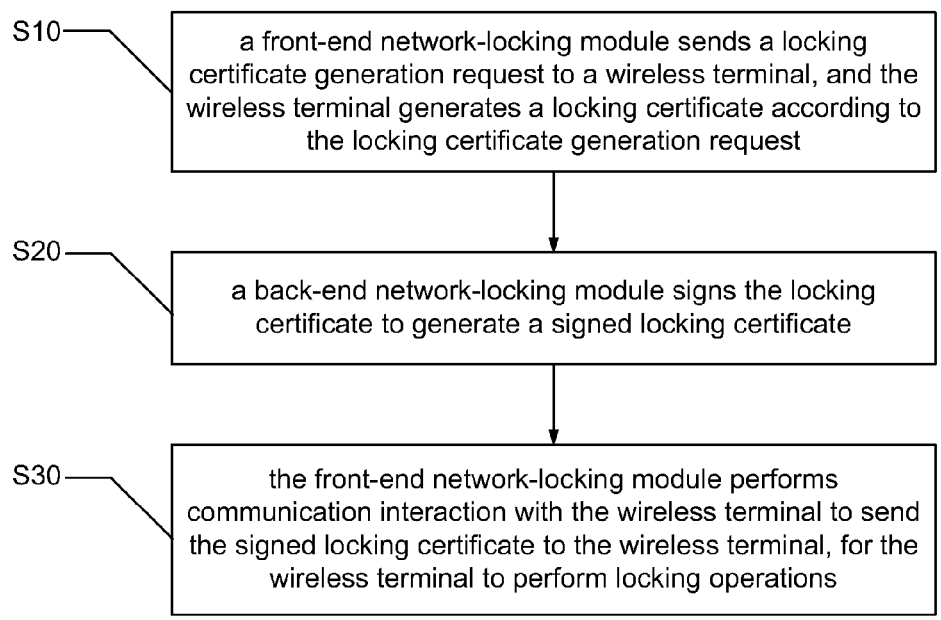
FIG. 1 is a flow chart of a network locking method for a wireless terminal according to a preferred embodiment of the present disclosure.

Referring to FIG. 1, an embodiment of the present disclosure provides a network locking method for a wireless terminal, including the following steps:

Step S10: a front-end network-locking module sends a locking certificate generation request to a wireless terminal, and the wireless terminal generates a locking certificate according to the locking certificate generation request.

Step S20: a back-end network-locking module signs the locking certificate to generate a signed locking certificate. In the embodiment of the present disclosure, after the wireless terminal generates a locking certificate, a user can transmit, through email or copying, the locking certificate to a data processing terminal where the back-end network-locking module is located. After the back-end network-locking module generates a signed locking certificate, the user can transmit, through email or copying, the signed locking certificate to a data processing terminal where the front-end network-locking module is located, which then transmits the signed locking certificate to the wireless terminal.

Step S30: the front-end network-locking module performs communication interaction with the wireless terminal to send the signed locking certificate to the wireless terminal, for the wireless terminal to perform locking operations. In the embodiment of the present disclosure, the front-end network-locking module can send the signed locking certificate to the wireless terminal according to a request sent by the wireless terminal, and send, according to a response message about allowing locking operations fed back by the wireless terminal, locking data to the wireless terminal for the wireless terminal to perform locking operations.

In the embodiment of the present disclosure, the front-end network-locking module can be locking software loaded in a personal computer or other data processing terminals; the personal computer can be carried by an outfield tester.

In the embodiment of the present disclosure, the back-end network-locking module can be locking software loaded in a computer or other data processing terminals, and this computer is placed in the company, tester's home or a place selected by the tester. If the front end and the back end have a short distance therebetween, the back-end network-locking module and the front-end network-locking module can be loaded in one same computer.

In the embodiment of the present disclosure, network-locking software can be loaded in the wireless terminal, wherein the network-locking software at least includes a locking certificate processing unit and a network-locking unit. The locking certificate processing unit holds responsibility for the generation of locking certificate and the verification of certificate validity, while network-locking unit holds responsibility for locking and unlocking operations. It should be noted that in the embodiment of the present disclosure the network-locking software in the wireless terminal and the back-end network-locking module, the front-end network-locking module can belong to one kind of software, or can be independent software.

The embodiment of the present disclosure divides the network-locking operation into a front end part and a back end part; the front-end network-locking module is configured to generate a locking certificate and to perform locking operations, while the back-end network-locking module is configured to digitally sign the locking certificate. During outfield testing, a front-end tester first uses the front-end network-locking module and the wireless terminal to be locked with a network to generate a locking certificate, and then sends the generated locking certificate to the back end (company or home), then the back-end network-locking module signs the locking certificate and then sends the signed locking certificate to a data processing terminal where the front-end network-locking module is located; next, the front-end network-locking module sends the signed locking certificate to the wireless terminal to perform locking operations. With this scheme, there is no need to send a softdog to the front end. This scheme not only can reduce cost, but also can greatly reduce the security risk brought to network locking by outfield testing.

Figure 2:
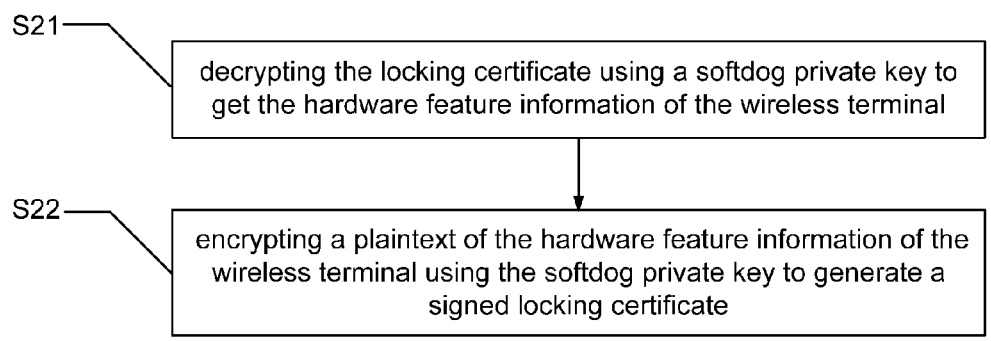
FIG. 2 is a flow chart of the step that a back-end network-locking module generates a signed locking certificate according to a preferred embodiment of the present disclosure.

Referring to FIG. 2, in a preferred embodiment of the present disclosure, step S20 includes:

Step S21: decrypting the locking certificate using a softdog private key to get hardware feature information of the wireless terminal.

Step S22: encrypting a plaintext of the hardware feature information of the wireless terminal using a softdog private key to generate a signed locking certificate.

In the embodiment of the present disclosure, the softdog is set in the back-end network-locking module, so that the sign of the locking certificate is finished at the company or a place specified by the tester only, without the outfield tester carrying the softdog or emailing the encrypted softdog to the front end, thus, the network locking cost is reduced and the risk due to the loss of softdog caused by the improper storage at the front end is avoided.

Further, in a preferred embodiment of the present disclosure, step S30 further includes:

encrypting locking data using a softdog private key and inserting a ciphertext into the signed locking certificate. By encrypting locking data through a softdog communicating with the back-end network-locking module, the embodiment of the present disclosure further guarantees the security performance of the locking data and improves the security level of outfield testing.

Figure 3:
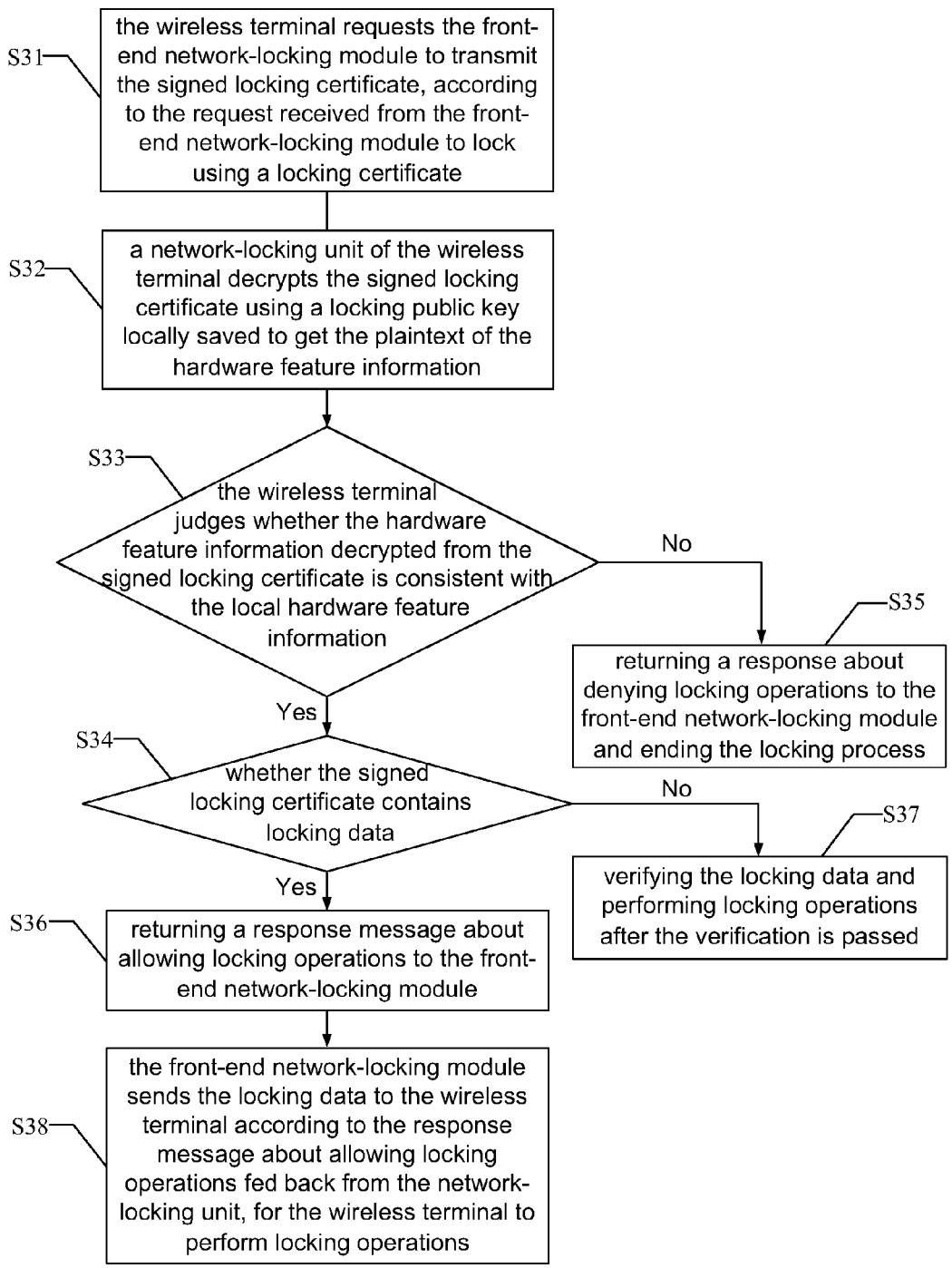
FIG. 3 is a flow chart of the step that a wireless terminal performs locking operations according to a preferred embodiment of the present disclosure.

Referring to FIG. 3, in a preferred embodiment, step S30 further includes:

Step S31: the wireless terminal requests the front-end network-locking module to transmit the signed locking certificate, according to the request received from the front-end network-locking module to lock using a locking certificate.

Step S32: a network-locking unit of the wireless terminal decrypts the signed locking certificate using a locking public key locally saved to get the plaintext of the hardware feature information.

Step S33: the wireless terminal judges whether the hardware feature information in the signed locking certificate is consistent with the local hardware feature information; if so, step S34 is executed; otherwise, step S35 is executed and the wireless terminal returns a response about denying locking operations and ends the locking process.

Step S34: after receiving the signed locking certificate, the wireless terminal checks whether the signed locking certificate contains locking data; if not, step S36 is executed; otherwise, step S37 is executed and the wireless terminal verifies the locking data and performs locking operations after the verification is passed.

Step S36: the wireless terminal returns a response message about allowing locking operations to the front-end network-locking module.

Step S38: the front-end network-locking module sends the locking data to the wireless terminal according to the response message about allowing locking operations fed back from the network-locking unit, for the wireless terminal to perform locking operations.

In the embodiment of the present disclosure, after the back-end network-locking module finishes signing the locking certificate, the front-end network-locking module sends to the wireless terminal a request to lock using a locking certificate; after receiving the request, the wireless terminal requests the locking certificate from the front-end network-locking module, then the front-end network-locking module transmits the signed locking certificate to the wireless terminal, for the wireless terminal to decrypt. The wireless terminal can decrypt the signed locking certificate using a locking public key locally saved to get the plaintext of the hardware feature information, and compare the hardware feature information with the hardware feature information locally stored; if the hardware feature information is consistent, the wireless terminals returns a response message about allowing locking operations to the front-end network-locking module, which then sends the locking data to the wireless terminal according to the response message; and then the wireless terminal performs locking operations.

Figure 4:
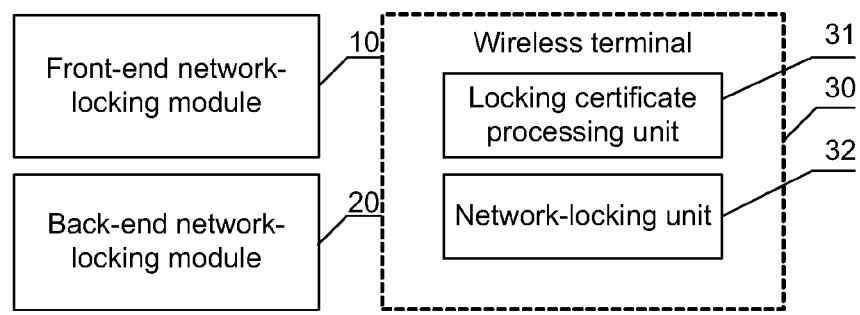
FIG. 4 is a structure diagram of a network locking system for a wireless terminal according to a preferred embodiment of the present disclosure.

The embodiment of the present disclosure also provides a network-locking system for a wireless terminal, which can be used to implement the above method, to solve the technical problem existing in the related art and achieve all benefits mentioned in the above method. Referring to FIG. 4, in a preferred embodiment of the present disclosure, the network-locking system includes a front-end network-locking module 10, a back-end network-locking module 20 and a wireless terminal 30, wherein the front-end network-locking module 10 is configured to send a locking certificate generation request to the wireless terminal 30;

the back-end network-locking module 20 is configured to sign a locking certificate to generate a signed locking certificate;

the front-end network-locking module 10 is further configured to perform communication interaction with the wireless terminal 30 to send the signed locking certificate to the wireless terminal 30 for the wireless terminal 30 to perform locking operations;

the wireless terminal 30 includes:

a locking certificate processing unit 31, which is configured to generate the locking certificate according to the locking certificate generation request;

a network-locking unit 32, which is configured to perform communication interaction with the front-end network-locking module and to perform locking operations according to the signed locking certificate.

In the embodiment of the present disclosure, the front-end network-locking module 10 can be locking software loaded in a personal computer or other data processing terminals; the personal computer can be carried by an outfield tester. During outfield testing, the locking software sends a locking certificate generation request to the wireless terminal 30.

In the embodiment of the present disclosure, network-locking software can be loaded in the wireless terminal 30, wherein the network-locking software at least includes a locking certificate processing unit 31 and a network-locking unit 32. The locking certificate processing unit 31 holds responsibility for the generation of locking certificate and the verification of certificate validity, while network-locking unit 32 holds responsibility for locking and unlocking operations. After receiving a locking certificate generation request sent by the front-end network-locking module 10, the locking certificate processing unit 31 reads from the wireless terminal 30 the hardware feature information (for example, hardware ID or International Mobile Equipment Identity (IMEI) number and the like) which can identify the wireless terminal 30 uniquely, and then encrypts it using an encryption public key to generate a locking certificate. It should be noted that in the embodiment of the present disclosure the network-locking software in the wireless terminal 30 and the back-end network-locking module 20, the front-end network-locking module 10 can belong to one kind of software, or can be independent software compatible with each other.

In the embodiment of the present disclosure, the back-end network-locking module 20 can be locking software loaded in a computer or other data processing terminals, and this computer is placed in the company, tester's home or a place selected by the tester. In the embodiment of the present disclosure, after the wireless terminal 30 generates a locking certificate, the front-end network-locking module 10 can save the locking certificate as a file form; a user can transmit, through email or copying and the like, the locking certificate to the back-end network-locking module 20 via a data processing terminal loaded with the front-end network-locking module 10. After the back-end network-locking module 20 generates a signed locking certificate, the user can transmit, through email or copying and the like, the signed locking certificate to a data processing terminal where the front-end network-locking module 10 is located, which then transmits the signed locking certificate to the wireless terminal 30.

In the embodiment of the present disclosure, the locking certificate is signed by the back-end networking-locking module 20, then a user transmits, through email or copying and the like, the signed locking certificate to a data processing terminal where the front-end network-locking module 10 is located; then the front-end network-locking module 10 transmits the signed locking certificate to the wireless terminal 30 to perform locking operations. With this scheme, there is no need to send a softdog to the front end. This scheme not only can reduce cost, but also can greatly reduce the security risk brought to network locking by outfield testing.

In a preferred embodiment of the present disclosure, the back-end network-locking module 20 is configured to:

decrypt the locking certificate using a softdog private key to get hardware feature information of the wireless terminal;

encrypt a plaintext of the hardware feature information of the wireless terminal using a softdog private key to generate a signed locking certificate.

Further, the back-end network-locking module 20 is configured to encrypt locking data using a softdog private key and to insert a ciphertext into the signed locking certificate. By encrypting locking data through a softdog communicating with the back-end network-locking module, the embodiment of the present disclosure further guarantees the security performance of the locking data and improves the security level of outfield testing.

Further, the network-locking unit 32 is configured to:

receive a request from the front-end network-locking module 10 to lock using a locking certificate and request the front-end network-locking module 10 to transmit the signed locking certificate;

after receiving the signed locking certificate, check whether the signed locking certificate contains locking data; if so, verify the locking data and perform locking operations after the verification is passed;

otherwise, return a response message about allowing locking operations to the front-end network-locking module 10.

The front-end network-locking module 10 is further configured to send the locking data to the wireless terminal 30 according to the response message about allowing locking operations fed back from the network-locking unit 32, for the wireless terminal 30 to perform locking operations.

The front-end network-locking module 10 is further configured to send to the wireless terminal 30 a request to lock using a locking certificate, to send the signed locking certificate to the wireless terminal 30 according to the feedback from the wireless terminal 30 for the wireless terminal 30 to decrypt, and to send locking data to the wireless terminal 30 according to a response message of allowing locking operations fed back from the wireless terminal 30. For example, in the embodiment of the present disclosure, after the back-end network-locking module 20 signs the locking certificate, the front-end network-locking module 10 sends to the wireless terminal 30 a request to lock using a locking certificate; after receiving the request, the wireless terminal 30 requests the locking certificate from the front-end network-locking module 10, then the front-end network-locking module 10 transmits the signed locking certificate to the wireless terminal 30, for the wireless terminal 30 to decrypt. The wireless terminal 30 can decrypt the signed locking certificate using a locking public key locally saved to get the plaintext of the hardware feature information, and compare the hardware feature information in the signed locking certificate with the local hardware feature information; if the hardware feature information is consistent, the wireless terminal 30 returns a response message about allowing locking operations to the front-end network-locking module 10; then the front-end network-locking module 10 sends the locking data to the wireless terminal 30 according to the response message, for the wireless terminal 30 to perform locking operations.

In the embodiment of the present disclosure, the network-locking unit 32 is further configured to:

decrypt the signed locking certificate using a locking public key locally saved to get the plaintext of the hardware feature information;

judge whether the hardware feature information in the signed locking certificate is consistent with the local hardware feature information; if so, check whether the signed locking certificate contains locking data; otherwise, return a response about denying locking operations and end the locking process.

In a preferred embodiment of the present disclosure, the working process of the network locking system for a wireless terminal includes the following steps:

first, the front-end network-locking module 10 sends a locking certificate generation request to the wireless terminal 30;

then, the wireless terminal 30 reads hardware feature information and decrypts the hardware feature information using a locking public key saved locally to generate a locking certificate;

the wireless terminal 30 returns the generated locking certificate to the front-end network-locking module 10;

the front-end network-locking module 10 sends the locking certificate to the back-end network-locking module 20;

the back-end network-locking module 20 decrypts the locking certificate using a softdog private key to get the hardware feature information of the wireless terminal 30;

the back-end network-locking module 20 encrypts a plaintext of the hardware feature information of the wireless terminal 30 using a softdog private key, to generate a signed locking certificate and to send it to the front-end network-locking module 10;

the front-end network-locking module 10 sends to the wireless terminal 30 a request to lock using a locking certificate;

the locking certificate processing unit 31 of the wireless terminal 30 requests a locking certificate from the front-end network-locking module 10;

the front-end network-locking module 10 transmits the signed locking certificate to the wireless terminal 30;

the wireless terminal 30 decrypts the locking certificate using a locking public key locally saved to get a plaintext of the hardware feature information;

the wireless terminal 30 verifies whether the hardware feature information decrypted from the certificate is consistent with the hardware feature information of the wireless terminal 30 itself; if not, the wireless terminal 30 returns a response message about denying locking operations to the front-end network-locking module 10 and ends the locking process; otherwise, the wireless terminal 30 checks whether the signed locking certificate contains locking data; if not, the wireless terminal 30 returns a response message about allowing locking operations to the front-end network-locking module 10; otherwise, the front-end network-locking module 10 sends the locking data to the wireless terminal 30; the wireless terminal 30 verifies the locking data and performs locking operations after the verification is passed;

the wireless terminal 30 returns an unlock code and a locking success indication to the front-end network-locking module 10.

Figure 5:
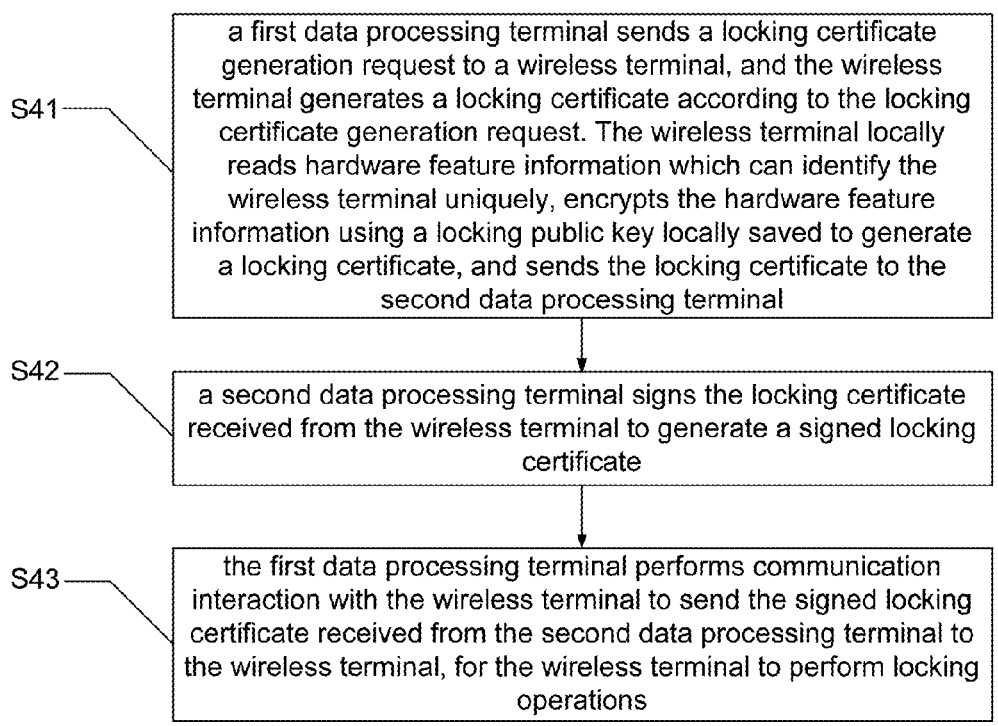
FIG. 5 is a flow chart of a network locking method for a wireless terminal according to a preferred embodiment of the present disclosure.

FIG. 5 show a flow chart of a network locking method for a wireless terminal according to a preferred embodiment of the present disclosure. The network locking method for a wireless terming includes the following steps.

Step S41: a first data processing terminal sends a locking certificate generation request to a wireless terminal, and the wireless terminal generates a locking certificate according to the locking certificate generation request. The wireless terminal locally reads hardware feature information which can identify the wireless terminal uniquely, encrypts the hardware feature information using a locking public key locally saved to generate a locking certificate, and send the locking certificate to the second data processing terminal.

S42: a second data processing terminal signs the locking certificate received from the wireless terminal to generate a signed locking certificate.

S43: the first data processing terminal performs communication interaction with the wireless terminal to send the signed locking certificate received from the second data processing terminal to the wireless terminal, for the wireless terminal to perform locking operations.

Figure 6:
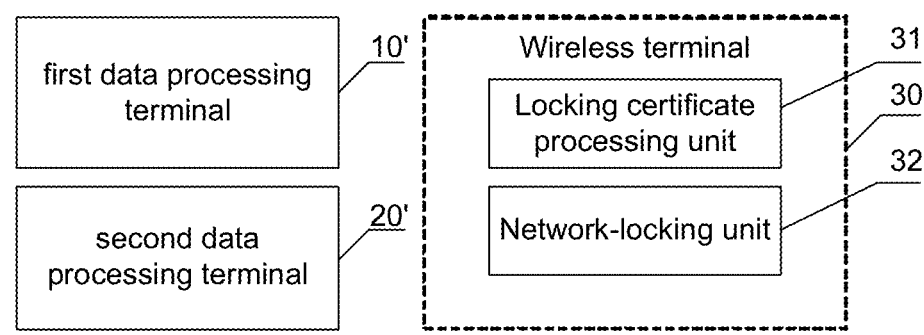
FIG. 6 is a structure diagram of a network locking system for a wireless terminal according to a preferred embodiment of the present disclosure.

FIG. 6 show a structure diagram of a network locking system for a wireless terminal according to a preferred embodiment of the present disclosure. The network locking system for a wireless terminal 30, includes a first data processing terminal 10' and a second data processing terminal 20'. The wireless terminal 30 performs communication interaction with the first data processing terminal 10' and the second data processing terminal 20'.

The first data processing terminal 10' is configured to send a locking certificate generation request to the wireless terminal 30.

The second data processing terminal 20' is configured to sign the locking certificate, which is generated by the wireless terminal 30 in response to the locking certificate generation request and received from the wireless terminal 30, to generate a signed locking certificate.

The first data processing terminal 10' is further configured to perform communication interaction with the wireless terminal 30, to send the signed locking certificate received from the second data processing terminal 20' to the wireless terminal 30 for the wireless terming 30 to perform locking operation.

The wireless terming 30 includes a locking certificate processing unit 31 and a network-locking unit 32.

The locking certificate processing unit 31 is configure to generate the locking certificate according to the locking certificate generation request.

The network-locking unit 32 is configured to perform communication interaction with the first data processing terminal 10' and to perform locking operations according to the signed locking certificate.

The locking certificate processing unit 31 is configured to read locally hardware feature information which can identify the wireless terminal 30 uniquely, to encrypt the hardware feature information using a locking public key locally saved to generate a locking certificate, and to send the locking certificate to the second data processing terminal 20'.

The above are the preferred embodiments of the present disclosure one and are not intended to limit the scope of protection of the present disclosure.

INDUSTRIAL APPLICABILITY

Compared with the conventional art, the embodiment of the present disclosure divides the network-locking operation into a front end part and a back end part; the front-end network-locking module is configured to generate a locking certificate and to perform locking operations, while the back-end network-locking module is configured to digitally sign the locking certificate. During outfield testing, a front-end tester first uses the front-end network-locking module and the wireless terminal to be locked with a network to generate a locking certificate, and then sends the generated locking certificate to the back end (company or home), then the back-end personnel uses the back-end network-locking module and the softdog to sign the locking certificate, and then sends the signed locking certificate to the front-end tester; next, the front-end tester uses the front-end network-locking module to send the signed locking certificate to the wireless terminal to perform locking operations. With this scheme, there is no need to send a softdog to the front end. This scheme not only can reduce cost, but also can greatly reduce the security risk brought to network locking by outfield testing.

What is claimed is:

1. A network locking method for a wireless terminal, comprising:
   sending, by a first data processing terminal, a locking certificate generation request to a wireless terminal, and generating, by the wireless terminal, a locking certificate according to the locking certificate generation request;
   signing, by a second data processing terminal, the locking certificate received from the wireless terminal to generate a signed locking certificate;
   performing, by the first data processing terminal, communication interaction with the wireless terminal to send the signed locking certificate received from the second data processing terminal to the wireless terminal, for the wireless terminal to perform locking operations,
   wherein the step of generating, by the wireless terminal, a locking certificate according to the locking certificate generation request comprises:
   reading locally, by the wireless terminal, hardware feature information which can identify the wireless terminal uniquely, encrypting the hardware feature information using a locking public key locally saved to generate a locking certificate, and sending the locking certificate to the second data processing terminal.

2. The network locking method for a wireless terminal according to claim 1, wherein the step of signing, by a second data processing terminal, the locking certificate received from the wireless terminal to generate a signed locking certificate comprises:
   decrypting the locking certificate using a private key of an encryption lock to get the hardware feature information of the wireless terminal; and
   encrypting a plaintext of the hardware feature information of the wireless terminal using the private key of the encryption lock to generate a signed locking certificate.

3. The network locking method for a wireless terminal according to claim 2, wherein the step of signing, by a second data processing terminal, the locking certificate received from the wireless terminal to generate a signed locking certificate further comprises:
   encrypting locking data using the private key of the encryption lock and inserting a ciphertext into the signed locking certificate.

4. The network locking method for a wireless terminal according to claim 1, wherein the step of performing communication interaction with the wireless terminal, by the first data processing terminal, to send the signed locking certificate received from the second data processing terminal to the wireless terminal for the wireless terminal to perform locking operations comprises:
   requesting, by the wireless terminal, the first data processing terminal to transmit the signed locking certificate, according to the request received from the first data processing terminal to lock using a locking certificate;
   after receiving the signed locking certificate, checking, by the wireless terminal, whether the signed locking certificate contains locking data; if so, verifying the locking data and performing locking operations after the verifying is passed;
   otherwise, returning a response message about allowing locking operations to the first data processing terminal;
   sending, by the first data processing terminal, the locking data to the wireless terminal according to the response message about allowing locking operations fed back from a network-locking unit, for the wireless terminal to perform locking operations.

5. The network locking method for a wireless terminal according to claim 4, further comprising: before the wireless terminal checks whether the signed locking certificate contains locking data,
   decrypting, by the wireless terminal, the signed locking certificate using a locking public key locally saved to get a plaintext of hardware feature information;
   judging whether the hardware feature information in the signed locking certificate is consistent with local hardware feature information; if so, checking whether the signed locking certificate contains locking data; otherwise, returning a response about denying locking operations and ending the locking process.

6. A network locking system for a wireless terminal, comprising:
   a first data processing terminal and a second data processing terminal;
   the wireless terminal for performing communication interaction with the first data processing terminal and the second data processing terminal, wherein
   the first data processing terminal is configured to send a locking certificate generation request to the wireless terminal;
   the second data processing terminal is configured to sign the locking certificate, which is generated by the wireless terminal in response to the locking certificate generation request and received from the wireless terminal, to generate a signed locking certificate;
   the first data processing terminal is further configured to perform communication interaction with the wireless terminal, to send the signed locking certificate received from the second data processing terminal to the wireless terminal for the wireless terminal to perform locking operations;
   the wireless terminal comprises:
   a locking certificate processing unit, which is configured to generate the locking certificate according to the locking certificate generation request;
   a network-locking unit, which is configured to perform communication interaction with the first data processing terminal and to perform locking operations according to the signed locking certificate,
   wherein the locking certificate processing unit is configured to read locally hardware feature information which can identify the wireless terminal uniquely, to encrypt the hardware feature information using a locking public key locally saved to generate a locking certificate, and to send the locking certificate to the second data processing terminal.

7. The network locking system for a wireless terminal according to claim 6, wherein the second data processing terminal is configured to decrypt the locking certificate using a private key of an encryption lock to get the hardware feature information of the wireless terminal, and to encrypt a plaintext of the hardware feature information of the wireless terminal using the private key of the encryption lock to generate a signed locking certificate.

8. The network locking system for a wireless terminal according to claim 7, wherein the second data processing terminal is configured to encrypt locking data using the private key of the encryption lock and to insert a ciphertext into the signed locking certificate.

9. The network locking system for a wireless terminal according to claim 6, wherein the network-locking unit is configured to: receive a request from the first data processing terminal to lock using a locking certificate and request the first data processing terminal to transmit the signed locking certificate; after receiving the signed locking certificate, check whether the signed locking certificate contains locking data; if so, verify the locking data and perform locking operations after the verifying is passed; otherwise, return a response message about allowing locking operations to the first data processing terminal;

the first data processing terminal is further configured to send the locking data to the wireless terminal according to the response message about allowing locking operations fed back from the network-locking unit, for the wireless terminal to perform locking operations.

10. The network locking system for a wireless terminal according to claim 9, wherein the network-locking unit is further configured to: decrypt the signed locking certificate using a locking public key locally saved to get a plaintext of hardware feature information, and judge whether the hardware feature information in the signed locking certificate is consistent with local hardware feature information; if so, check whether the signed locking certificate contains locking data; otherwise, return a response about denying locking operations and end the locking process.

* * * * *